(12) United States Patent
Beck et al.

(10) Patent No.: US 10,981,679 B2
(45) Date of Patent: Apr. 20, 2021

(54) SATELLITE DEPLOYER DOOR RELEASE MECHANISM

(71) Applicant: Rocket Lab USA, Inc., Huntington Beach, CA (US)

(72) Inventors: Peter Beck, Auckland (NZ); Peter Barlow, Huntington Beach, CA (US); David Yoon, La Crescenta, CA (US); Ben Malcolm, Auckland (NZ)

(73) Assignee: Rocket Lab USA, Inc., Huntington Beach, CA (US)

( * ) Notice: Subject to any disclaimer, the term of this patent is extended or adjusted under 35 U.S.C. 154(b) by 195 days.

(21) Appl. No.: 16/051,266

(22) Filed: Jul. 31, 2018

(65) Prior Publication Data

US 2019/0039754 A1     Feb. 7, 2019

Related U.S. Application Data

(60) Provisional application No. 62/541,493, filed on Aug. 4, 2017.

(51) Int. Cl.
    *B64G 1/22*         (2006.01)
    *B26D 5/12*         (2006.01)
    (Continued)

(52) U.S. Cl.
    CPC ............. *B64G 1/22* (2013.01); *B26D 5/12* (2013.01); *B60P 7/135* (2013.01); *B60P 7/16* (2013.01);
    (Continued)

(58) Field of Classification Search
    CPC ........ B64G 1/641; B64G 1/645; B64G 1/007; B64G 1/22; B64G 1/222; B64G 2001/643;
    (Continued)

(56) References Cited

U.S. PATENT DOCUMENTS

| 3,144,956 A | 8/1964 | Anderson |
| 3,991,649 A * | 11/1976 | Patrichi ................ B23D 15/145 89/1.14 |

(Continued)

FOREIGN PATENT DOCUMENTS

| CN | 106081170 A | 11/2016 |
| KR | 20160147547 A | 12/2016 |
| WO | 2008034550 A1 | 3/2008 |

OTHER PUBLICATIONS

"Small Spacecraft Technology State of the Art", Dec. 2015, NASA Mission Design Division, pp. 125-129 (Year: 2015).*

(Continued)

*Primary Examiner* — Claude J Brown
(74) *Attorney, Agent, or Firm* — Van Pelt, Yi & James LLP

(57) ABSTRACT

A satellite dispenser door release mechanism is disclosed. In various embodiments, a satellite door dispenser as disclosed herein includes a wire or cable having a first end configured to be secured in a structure comprising or coupled to a dispenser body of a satellite dispenser and a second end configured to be secured in a structure comprising or coupled to a dispenser door of the satellite dispenser; and a pyrotechnic cutter configured to receive the wire or cable in a position to cut the wire or cable upon firing of the pyrotechnic cutter.

13 Claims, 4 Drawing Sheets

(51) Int. Cl.

| | |
|---|---|
| *B60P 7/16* | (2006.01) |
| *B60P 7/135* | (2006.01) |
| *E05D 3/08* | (2006.01) |
| *E05D 7/00* | (2006.01) |
| *E05F 1/10* | (2006.01) |
| *E05F 3/20* | (2006.01) |
| *F16C 29/00* | (2006.01) |
| *F16C 33/24* | (2006.01) |
| *F42B 3/00* | (2006.01) |
| *B64G 1/00* | (2006.01) |
| *B64G 1/64* | (2006.01) |

(52) U.S. Cl.
CPC .............. *E05D 3/08* (2013.01); *E05D 7/00* (2013.01); *E05F 1/105* (2013.01); *E05F 3/20* (2013.01); *F16C 29/005* (2013.01); *F16C 33/24* (2013.01); *B64G 1/007* (2013.01); *B64G 1/222* (2013.01); *B64G 1/645* (2013.01); *E05Y 2201/216* (2013.01); *E05Y 2201/426* (2013.01); *E05Y 2900/50* (2013.01); *E05Y 2900/531* (2013.01); *F16C 2208/82* (2013.01); *F16C 2223/32* (2013.01); *F16C 2326/47* (2013.01); *F42B 3/006* (2013.01)

(58) Field of Classification Search
CPC ... B26D 5/12; B60P 7/135; B60P 7/16; E05D 3/08; E05D 7/00; E05F 1/105; E05F 3/20; E05Y 2201/216; E05Y 2201/426; E05Y 2900/50; F16C 2208/82; F16C 2223/32; F16C 2326/47; F16C 29/005; F16C 33/24; F42B 3/006
USPC ...................................................... 244/173.3
See application file for complete search history.

(56) References Cited

U.S. PATENT DOCUMENTS

| | | | |
|---|---|---|---|
| 4,210,274 A | 7/1980 | Leonard | |
| 4,540,873 A * | 9/1985 | Kester | B64G 1/222 |
| | | | 219/200 |
| 4,771,971 A | 9/1988 | Ludwig | |
| 4,779,826 A | 10/1988 | Kiendl | |
| 4,936,367 A | 6/1990 | Marello | |
| 4,984,666 A | 1/1991 | Orii | |
| 5,050,821 A | 9/1991 | Kerstein | |
| 5,109,571 A | 5/1992 | Ohshima | |
| 5,364,046 A * | 11/1994 | Dobbs | B64G 1/646 |
| | | | 244/172.4 |
| 5,462,800 A | 10/1995 | Yamazaki | |
| 5,664,897 A | 9/1997 | Hennings | |
| 5,743,492 A | 4/1998 | Chan | |
| 5,755,406 A | 5/1998 | Aston | |
| 5,755,407 A | 5/1998 | Aubret | |
| 5,848,766 A | 12/1998 | Thompson | |
| 6,126,115 A | 10/2000 | Carrier | |
| 6,227,493 B1 | 5/2001 | Holemans | |
| 6,357,699 B1 | 3/2002 | Edberg | |
| 6,532,628 B2 | 3/2003 | Kim | |
| 6,668,985 B2 | 12/2003 | Krenkel | |
| 6,869,048 B2 | 3/2005 | Draisey | |
| 6,886,221 B2 | 5/2005 | Minami | |
| 6,901,836 B1 * | 6/2005 | Valembois | B23D 15/145 |
| | | | 225/6 |
| 6,904,644 B2 | 6/2005 | Oshima | |
| 6,905,097 B2 | 6/2005 | Blackwell-Thompson | |
| 7,065,834 B2 | 6/2006 | Lowry | |
| 7,107,648 B1 | 9/2006 | Lu | |
| 7,111,773 B1 | 9/2006 | So | |
| 7,155,780 B2 | 1/2007 | Chen | |
| 7,213,301 B2 | 5/2007 | Sakai | |
| 7,350,664 B2 | 4/2008 | Nam | |
| 7,386,918 B2 | 6/2008 | Tomizawa | |
| 7,401,381 B2 | 7/2008 | Konja | |
| 7,543,357 B2 | 6/2009 | Ishikawa | |
| 7,634,838 B2 | 12/2009 | Ge | |
| 7,699,378 B2 | 4/2010 | Smith | |
| 7,712,186 B2 | 5/2010 | Kang | |
| 7,814,620 B2 | 10/2010 | Lin | |
| 8,079,115 B2 | 12/2011 | Zhang | |
| 8,132,292 B2 | 3/2012 | Patterson | |
| 8,424,160 B2 | 4/2013 | Chen | |
| 8,432,677 B2 | 4/2013 | Duan | |
| 8,459,754 B2 | 6/2013 | Cho | |
| 8,745,820 B2 | 6/2014 | Janak | |
| 8,769,770 B2 | 7/2014 | Kullman | |
| 9,115,519 B2 | 8/2015 | Li | |
| 9,289,879 B2 | 3/2016 | Copeland | |
| 9,290,880 B2 | 3/2016 | Park | |
| 9,394,645 B2 | 7/2016 | Park | |
| 9,414,724 B2 | 8/2016 | Vallance | |
| 9,434,486 B1 * | 9/2016 | Santos | B64G 1/64 |
| 9,464,376 B2 | 10/2016 | Kim | |
| 9,725,940 B2 | 8/2017 | Lambright | |
| 9,796,488 B2 | 10/2017 | Cook | |
| 10,011,373 B1 | 7/2018 | Echelman | |
| 10,017,279 B2 | 7/2018 | Poncet | |
| 10,053,243 B2 | 8/2018 | Apland | |
| 10,370,124 B2 | 8/2019 | Dube | |
| 10,569,910 B2 | 2/2020 | Bogdanov | |
| 10,689,133 B2 | 6/2020 | Cheynet De Beaupre | |
| 10,773,831 B2 | 9/2020 | Wang | |
| 2003/0192522 A1 | 10/2003 | Taryoto | |
| 2005/0045771 A1 | 3/2005 | Caldwell | |
| 2005/0230562 A1 | 10/2005 | Buehler | |
| 2006/0049317 A1 | 3/2006 | Reutenauer | |
| 2012/0112010 A1 | 5/2012 | Young | |
| 2012/0280085 A1 | 11/2012 | Sinclair | |
| 2013/0099059 A1 | 4/2013 | Cheynet De Beaupre | |
| 2013/0282117 A1 | 10/2013 | Van Heugten | |
| 2014/0117028 A1 | 5/2014 | Huber | |
| 2014/0131521 A1 | 5/2014 | Apland et al. | |
| 2014/0319283 A1 * | 10/2014 | Holemans | B64G 1/641 |
| | | | 244/173.3 |
| 2016/0075452 A1 | 3/2016 | Robles | |
| 2016/0200459 A1 | 7/2016 | Aston | |
| 2016/0207605 A1 * | 7/2016 | Jensen | B64B 1/40 |
| 2017/0072647 A1 | 3/2017 | Perrillat et al. | |
| 2017/0081011 A1 * | 3/2017 | Matthews | B64D 1/02 |
| 2017/0174368 A1 | 6/2017 | Dube | |
| 2017/0225873 A1 | 8/2017 | Fougere | |
| 2017/0320597 A1 | 11/2017 | Lim | |
| 2017/0327253 A1 * | 11/2017 | Bogdanov | B64G 1/641 |
| 2018/0194494 A1 | 7/2018 | Dube | |

OTHER PUBLICATIONS

Donaldson et al. "Ejection and Recovery System for Cubesat Sized Ejectables on Sounding Rockets". Apr. 22, 2017. Retrieved from the Internet on Sep. 19, 2018. URL: <https://web.archive.org/web/20170422053555/http://rexusbexus.net/wp-content/uploads/2015/06/Suineadh-_IAC-Paper. pdf>.

Holemans et al. "Canisterized Satellite Dispenser (CSD) as a Standard for Integrating and Dispensing Hosted Payloads on Large Spacecraft and Launch Vehicles", May 2014.

* cited by examiner

SATELLITE DEPLOYER DOOR RELEASE MECHANISM

CROSS REFERENCE TO OTHER APPLICATIONS

This application claims priority to U.S. Provisional Patent Application No. 62/541,493 entitled SMALL SCALE SATELLITE DEPLOYER filed Aug. 4, 2017 which is incorporated herein by reference for all purposes.

GOVERNMENT LICENSE RIGHTS

This invention was made with Government support under Contract No. 2014-14031000011 awarded by a United States Government Agency. The United States Government has certain rights in the invention.

BACKGROUND OF THE INVENTION

Small scale satellites, such as CubeSat or other small satellites, may be launched into space in a launch vehicle that includes a plurality of such satellites, each contained in a "dispenser" device, sometimes referred to as a small scale satellite "deployer", configured to deploy the small scale satellite in a controlled manner, e.g., to achieve a target orbit. The terms "dispenser" and "deployer" are used interchangeably in this specification.

Satellites conforming to the CubeSat Design Specification may have a size and form factor of a corresponding type or class of CubeSat as defined by the standard. The size and form factor of a CubeSat is based on a standard 10×10×11.35 cm3 unit designed to provide 10×10×10 cm3 (or 1 liter) of useful volume. CubeSats of different types may comprise a different number of such units. For example, CubeSats comprising 1, 3, 6, or 12 units, sometimes designated as 1 U, 3 U, 6 U, and 12 U CubeSats, respectively, may be encountered. Other satellites comprising other whole or fractional numbers of standard units may be launched and deployed.

Small scale satellite dispensers typically have a shape, size, and form factor to accommodate a corresponding small scale satellite, and commonly have a door that provides access to a payload area of the dispenser. The small scale satellite (payload) is loaded into the dispenser through the opening associated with the door, with the door in the open position. The door is closed and secured in the closed position. The dispenser may be arranged with other dispensers in a chassis configured to accommodate multiple dispensers. The chassis is loaded into a launch vehicle, such as a rocket, and launched into space. Control circuits initiate deployment of the small scale satellite at a time, orientation, etc. associated with the target orbit of each respective small scale satellite. Typically, a satellite is deployed by causing the dispenser door to open at a precise time, resulting in the small scale satellite being ejected from the dispenser and into orbit. Solar panels, antennae, and other appendages and auxiliary equipment may open, extend, or otherwise deploy once the small scale satellite has been ejected from the dispenser.

BRIEF DESCRIPTION OF THE DRAWINGS

Various embodiments of the invention are disclosed in the following detailed description and the accompanying drawings.

DETAILED DESCRIPTION

Figure 1A:
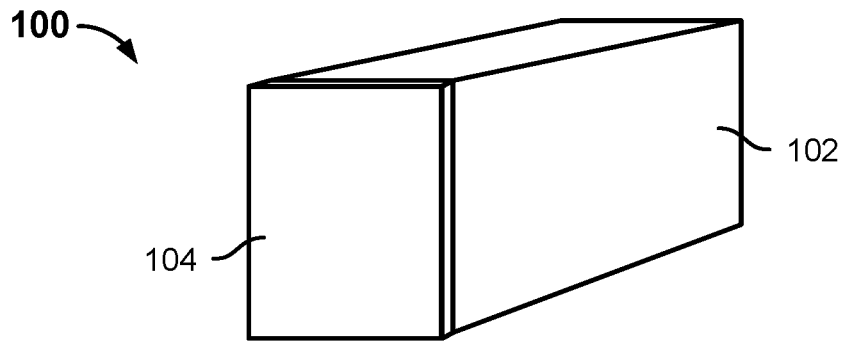
FIG. 1A is a diagram illustrating an embodiment of a small scale satellite dispenser.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A satellite deployer door release mechanism is disclosed. In various embodiments, a satellite deployer (or "dispenser") as disclosed herein includes a door at one end and a spring loaded or otherwise actuated pusher plate at an opposite end. To deploy a satellite, the door is opened, e.g., via a mechanism as disclosed herein, and the pusher plate pushes the payload (i.e., satellite) out of the dispenser. In various embodiments, a dispenser as disclosed herein may comprise a rectangular box-shaped container sized to have interior dimensions to accommodate a CubeSat or other payload of a specific size and form factor, such as a 1 U, 3 U, 6 U, or 12 U CubeSat.

In various embodiments, a dispenser as disclosed herein may have a spring-loaded door. To deploy the satellite, a pyrotechnic cutter is activated to cut a wire (e.g., 0.062 inch steel cable) that holds the door in a closed position. Once the wire is cut, a spring forces the door open, enabling the payload to be ejected. The spring force may be provided by a coil type spring that is compressed when the door is closed, one or more torsion springs at a hinged end of the door, etc.

In some embodiments, two adjacent pyrotechnic cutters are provided. In some embodiments a spring loaded retraction plunger, which may be located in a cavity within the door, retracts the wire once cut, e.g., to avoid the wire interfering with the door opening or satellite deployment. The spring loaded pusher in this example pushes the door open once the wire/cable has been cut.

FIG. 1A is a diagram illustrating an embodiment of a small scale satellite dispenser. In the example shown, dispenser 100 includes a dispenser casing or body 102 with a door 104 at one end. In the state shown in FIG. 1A, the dispenser door 104 is closed, as it would be subsequent to a small scale satellite being loaded into the dispenser 100 but before deployment.

Figure 1B:
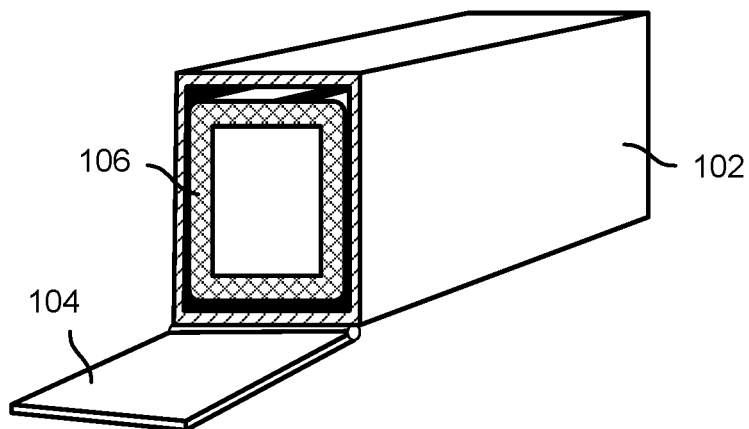
FIG. 1B is a diagram illustrating an embodiment of the small scale satellite dispenser 100 of FIG. 1A with the door 104 open.

FIG. 1B is a diagram illustrating an embodiment of the small scale satellite dispenser 100 of FIG. 1A with the door 104 open. A small scale satellite 106 is visible in the payload area defined by dispenser body 102. The state shown in FIG. 1B may be associated with loading the payload 106 into the dispenser 100, but prior to the door 104 being closed, and/or just prior to ejection of payload 106 after the door 104 being opened.

Figure 1C:
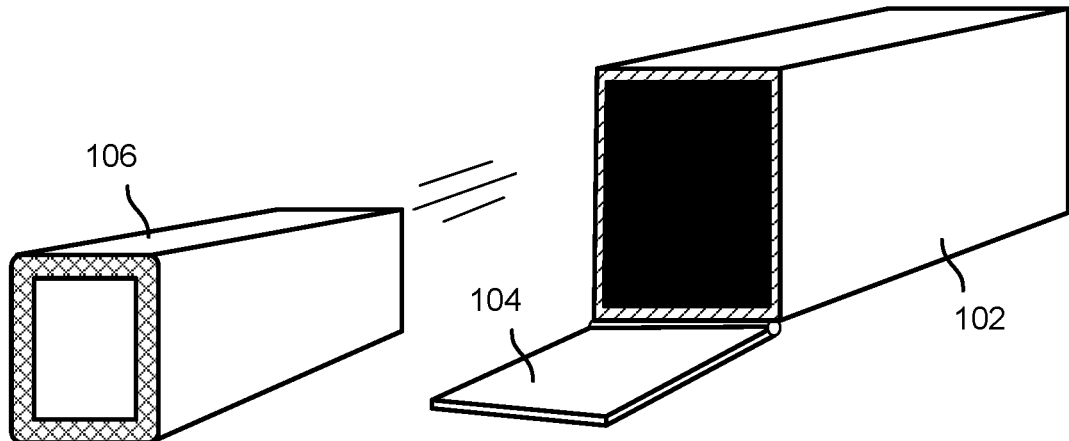
FIG. 1C is a diagram illustrating an embodiment of the small scale satellite dispenser 100 of FIG. 1A with the door 104 open and the payload 106 ejected from the payload area defined by dispenser body 102.

FIG. 1C is a diagram illustrating an embodiment of the small scale satellite dispenser 100 of FIG. 1A with the door 104 open and the payload 106 ejected from the payload area defined by dispenser body 102. In various embodiments, the payload 106 may have been ejected at least in part by a spring-loaded pusher plate against which the payload 106 had been pressed against during loading of payload 106 into dispenser 100, thereby compressing one or more springs associated with the pusher plate.

In various embodiments, the state of dispenser 100 as shown in FIGS. 1B and 1C is attained at least in part by activating a door release mechanism (not shown in FIGS. 1A through 1C) configured to hold door 104 in the closed position prior to activation. Upon activation of the door release mechanism, the door 104 is no longer held in the closed position. In various embodiments, one or more springs compressed by closing door 104 and securing door 104 in the closed position may, upon activation of the door release mechanism, cause the door 104 to be pushed open, as in FIGS. 1B and 1C, allowing the payload 106 to be ejected, as shown in FIG. 1C.

Figure 2A:
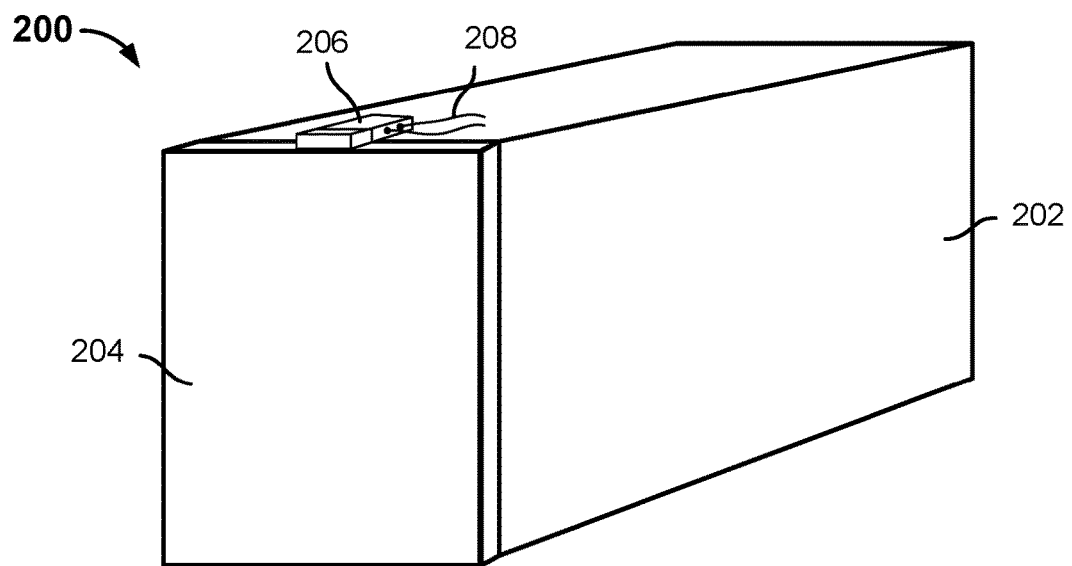
FIG. 2A is a diagram illustrating an embodiment of a small scale satellite dispenser provided with a pyrotechnic cutter door release mechanism prior to cutter activation.

FIG. 2A is a diagram illustrating an embodiment of a small scale satellite dispenser provided with a pyrotechnic cutter door release mechanism prior to cutter activation. In the example shown, satellite dispenser 200 includes a dispenser body 202 and door 204. The door 204 is held closed in the state shown by a door release mechanism 206 which in this example includes a wire or cable (not shown in FIG. 2A) to hold the door closed prior to deployment and two pyrotechnic cutters positioned and configured to cut the wire or cable to release the door 204 to enable the door 204 to open. In the example shown, electrical leads 208 are connected to the pyrotechnic cutters included in door release mechanism 206. In various embodiments, signals and/or power to activate the pyrotechnic cutters is/are provided via leads 208, e.g., from a driver or similar component comprising and/or otherwise associated with the dispenser 200.

Figure 2B:
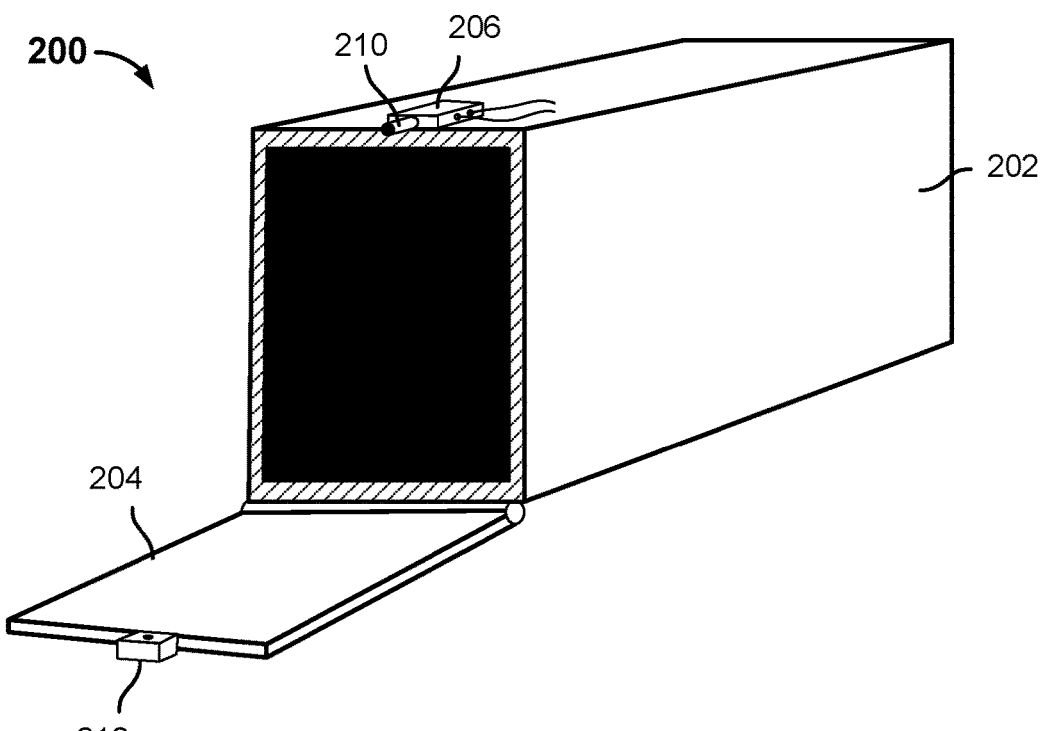
FIG. 2B is a diagram illustrating an embodiment of a small scale satellite dispenser provided with a pyrotechnic cutter door release mechanism after cutter activation.

FIG. 2B is a diagram illustrating an embodiment of a small scale satellite dispenser provided with a pyrotechnic cutter door release mechanism after cutter activation. In the state shown in FIG. 2B, the pyrotechnic cutters comprising door release mechanism 206 have been fired resulting in the cable or wire holding door 204 closed being cut. In the example shown, the door 204 has been assisted in opening by a spring-loaded pusher 210 being pushed out from the door release mechanism 206 once the wire or cable holding the door 204 shut had been cut. Also shown in FIG. 2B is a recess or cavity 212 into which a door side portion of the wire or cable that had been holding the door 204 closed has been pulled, e.g., by a spring-loaded plunger configured to extend into the cavity 212 pulling the door end of the cut wire or cable into cavity 212. In various embodiments, the wire or cable retraction mechanism configured to pull the free end of the cut wire or cable into cavity 212 ensures the loose (door) end of the cut wire or cable does not interfere with ejection and/or deployment of the small scale satellite from dispenser 200.

Figure 3A:
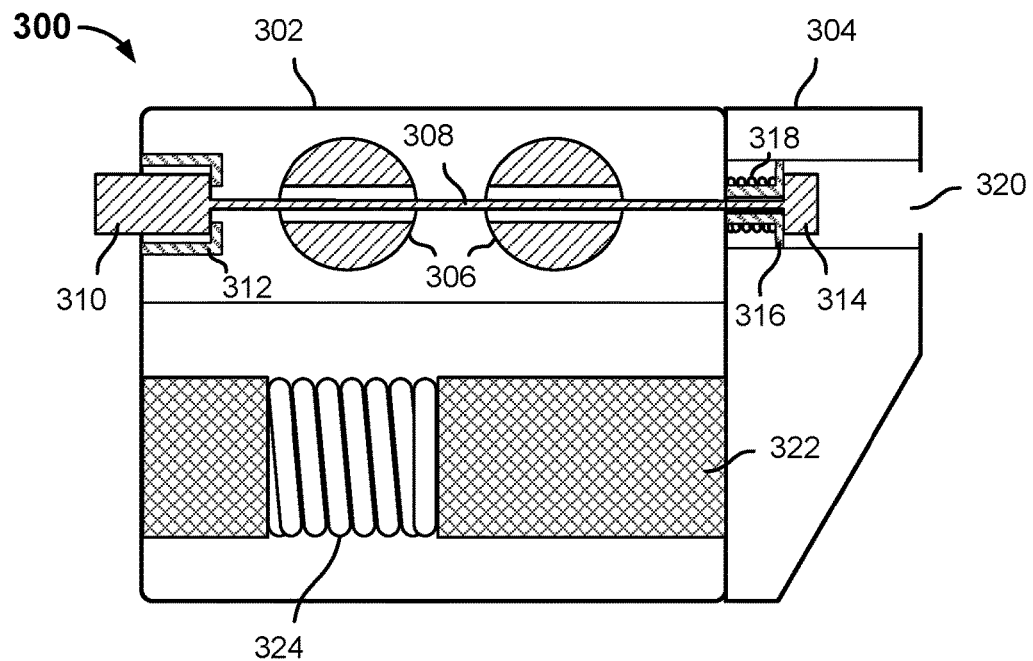
FIG. 3A is a diagram illustrating an embodiment of a pyrotechnic cutter door release mechanism of a small scale satellite dispenser.

FIG. 3A is a diagram illustrating an embodiment of a pyrotechnic cutter door release mechanism of a small scale satellite dispenser. In the example shown, door closure and release mechanism 300 is shown in a state subsequent to satellite dispenser door closure and prior to door release by cutter activation. In this example, door closure and release mechanism 300 includes components housed in a dispenser body side housing 302 and other components housed in a dispenser door side housing 304. In various embodiments, the dispenser body side housing 302 may be attached to and/or formed as an integral part of the satellite dispenser body. Similarly, in various embodiments, dispenser door side housing 304 may be attached to and/or formed as an integral part of the dispenser door.

Door closure and release mechanism 300 is shown to include a pair of pyrotechnic cutters 306 through which a closure wire or cable 308, e.g., 0.032 inch to 0.62 inch steel cable, has been run. In the state shown, the cable 308 is held in place at a dispenser-side end 310, in this example by butting up against a block 312 comprising the dispenser body side housing 302. The opposite (door side) end 314 of cable 308 is held in place against a retraction plunger 316, which is spring loaded through compression of spring 318. Door end 314 of cable 308, retraction plunger 316, and spring 318 are shown in this example to be positioned inside a cavity 320, e.g., a piston-shaped or other cavity, in door side housing 304.

In the dispenser door "closed" position shown, the door side housing 304 comprising and/or attached to the dispenser door is pressed and held against an opposite face/surface of the dispenser side housing 302. The door side housing 304 is held in place by the cable 308, against opposing force from a pusher 322 and compressed spring 324.

Figure 3B:
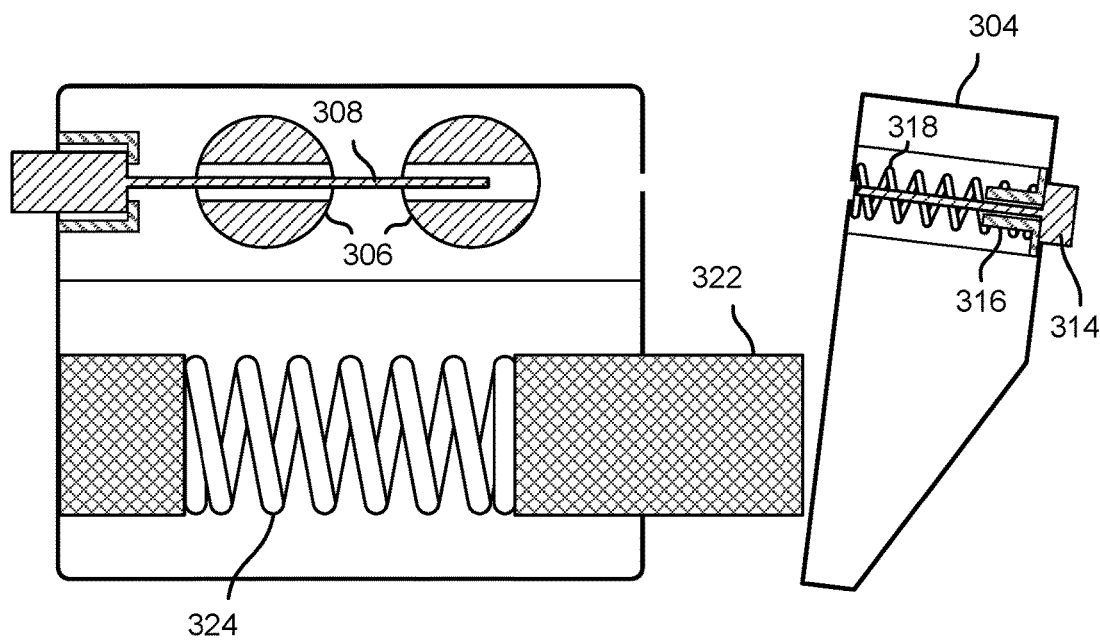
FIG. 3B is a diagram illustrating an embodiment of a pyrotechnic cutter door release mechanism of a small scale satellite dispenser, after cutter activation.

FIG. 3B is a diagram illustrating an embodiment of a pyrotechnic cutter door release mechanism of a small scale satellite dispenser, after cutter activation. In the state shown in FIG. 3B, the pyrotechnic cutters 306 have been activated and have cut cable 308.

In FIG. 3B cable 308 is shown as having been cut in one place; however, in various embodiments, the cutters 306 are activated simultaneously, and if each functions correctly the cable 308 may be cut in two places. In various embodiments, simultaneous activation of two (or more) pyrotechnic cutters 306 provides redundancy and ensures the cable 308 will be cut fully through in at least one place, ensuring satellite deployment. In some embodiments, a first one of the cutters 306 may be fired and additional cutters may be fired only if an indication is received that the first cutter failed to activate and/or to (fully) cut the cable 308.

In the state shown in FIG. 3B, the door side housing 304 has been decoupled from the dispenser body side housing 302 by cutting of the cable 308. As a result, the pusher 322 has been pushed out by expansion of spring 324, pushing the door side housing 304 and the dispenser door connected thereto and/or forming an integral part thereof to be pushed away from the dispenser body, propelling the door in the direction of the open state as shown in FIG. 2B, for example. In addition, the cutting of cable 308 by cutters 306 has allowed the spring 318 to expand, causing the cable retraction plunger 316 to be pushed further into the cavity or void 320, resulting in the door-side free end of the cut cable 308 being retracted into the cavity 320, ensuring the door side end of the cut cable 308 does not interfere with satellite ejection or deployment.

In various embodiments, deployment of a small scale satellite from a dispenser having a door release mechanism as disclosed herein is controlled by a flight control computer associated with a launch/deployment vehicle with which the dispenser is associated. The release of each payload is controlled to achieve a desired orbit for that payload. In some embodiments, the flight control computer comprises a processor configured to activate the door release mechanism disclosed herein to cause the dispenser door to open and the small scale satellite to be ejected when the launch and/or deployment vehicle is in a position, speed, orientation, etc., such that the dispenser located therein is in a corresponding position, speed, orientation, etc. such that opening of the dispenser door by activating the door release mechanism as disclosed herein causes the dispenser door to open and the satellite to be ejected on a trajectory that results in the satellite achieving a desired orbit.

Figure 4:
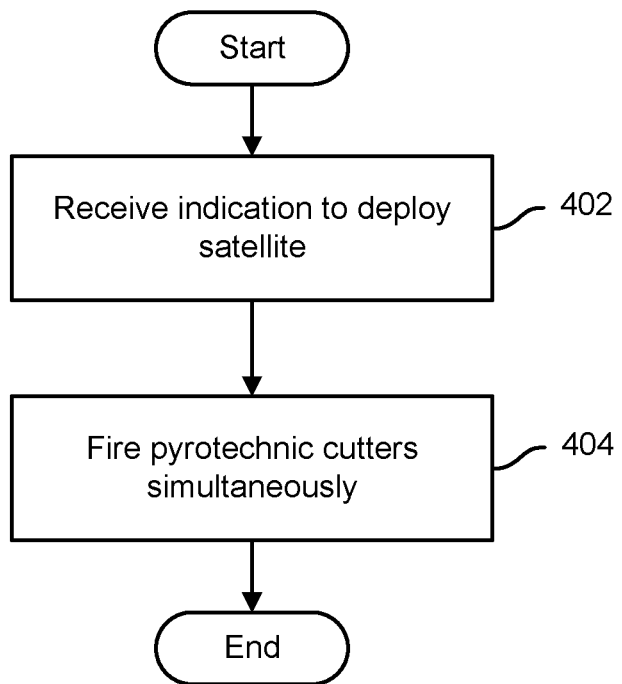
FIG. 4 is a flow chart illustrating an embodiment of a process to deploy a small scale satellite by activating a pyrotechnic cutter-based door release mechanism.

FIG. 4 is a flow chart illustrating an embodiment of a process to deploy a small scale satellite by activating a pyrotechnic cutter-based door release mechanism. In various embodiments, the process of FIG. 4 may be implemented by a flight computer or other processor or computer provided and configured to control the deployment of small scale satellites from dispensers having door release mechanisms as disclosed herein. In the example shown, an indication to deploy a given small scale satellite is received (402). For example, a flight control computer may determine that conditions to deploy the satellite have been met. Two (or more) pyrotechnic cutters comprising a door release mechanism of the dispenser are fired, simultaneously in this example (404). For example, a control signal may be sent from the flight computer to a control module and/or driver comprising a circuit board associated with the dispenser, causing a control signal and/or required electrical voltage and/or current to be supplied to the pyrotechnic cutters to activate the cutters and cut the cable (or wire) holding the dispenser door closed. In response, as described above, the cable (or wire) holding the dispenser door closed is cut, resulting in the door being pushed open and the satellite ejected/deployed.

Figure 5:
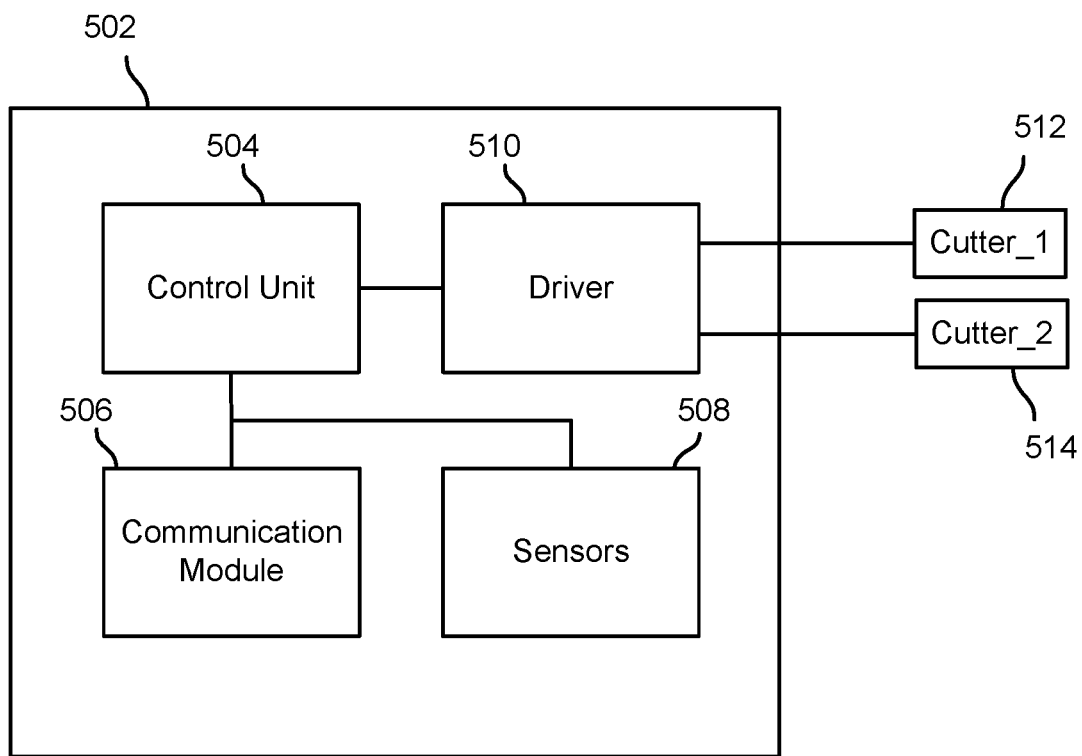
FIG. 5 is a block diagram illustrating an embodiment of a system to deploy a small scale satellite by activating a pyrotechnic cutter-based door release mechanism.

FIG. 5 is a block diagram illustrating an embodiment of a system to deploy a small scale satellite by activating a pyrotechnic cutter-based door release mechanism. In various embodiments, one or more of the components shown in FIG. 5 may be components of a circuit board or other structure comprising or otherwise associated with a small scale satellite dispenser as disclosed herein. In the example shown, control circuit 502 includes a control unit 504 configure to receive input via a communication module 506 and from one or more sensors 508. For example, a command from an external source (e.g., ground control, the launch/deployment vehicle, another spacecraft, etc.) may be received via communication module 506. In some embodiments, communication module 506 may comprises a network or other connection to a flight computer. In some embodiments, one or both of communication module 506 and sensor(s) 508 may be external to the control circuit 502. For example, one or both of communication module 506 and sensor(s) 508 may be components and/or functions performed by the launch vehicle flight computer. In various embodiments, control unit 504 may include a processor and/or memory or other storage. The processor comprising control unit 504 may use one or more of metadata stored in the memory comprising control unit 504, such as data indicating a desired orbit for a satellite and/or a launch position, speed, orientation, etc. to achieve the desire orbit; sensor output from sensors 508, such as location and speed sensors; and commands or other information received via communication module 506, to control satellite deployment via controlled activation of a dispenser door release mechanism as disclosed herein. In various embodiments, door release is performed by causing driver 510 to provide required control signals, voltages, and/or current to pyrotechnic cutters 512 and 514, e.g., to cause cutters 512 and 514 to fire and cut the cable or wire holding the dispenser door closed, resulting in the dispenser door opening and the satellite being ejected/deployed as disclosed herein.

In various embodiment, a satellite dispenser door release mechanism as disclosed herein ensure reliable deployment of a small scale satellite, while protecting against damage to the satellite during deployment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A satellite dispenser door release mechanism, comprising:
   a wire or cable having a first end configured to be secured in a structure comprising or coupled to a dispenser body of a satellite dispenser and a second end configured to be secured in a structure comprising or coupled to a dispenser door of the satellite dispenser; and
   a pyrotechnic cutter configured to receive the wire or cable in a position to cut the wire or cable upon firing of the pyrotechnic cutter;
   wherein the pyrotechnic cutter comprises a first pyrotechnic cutter and further comprising a second pyrotechnic cutter; and
   further comprising a control module configured to fire the second pyrotechnic cutter at least in part in response to receiving an indication that the first pyrotechnic cutter was fired or attempted to be fired but failed to cut the wire or cable.

2. The satellite dispenser door release mechanism of claim 1, further comprising a pusher and pusher spring assembly configured to exert a force to push the dispenser door toward an open position when the wire or cable has been cut.

3. The satellite dispenser door release mechanism of claim 1, wherein the wire or cable comprises 0.032 inch to 0.062 inch steel cable.

4. The satellite dispenser door release mechanism of claim 1, further comprising a retraction plunger and associated retraction spring configured to retract a door side end of the wire or cable into a cavity upon the wire or cable being cut.

5. The satellite dispenser door release mechanism of claim 1, further comprising a control module configured to receive an indication to deploy and to fire the pyrotechnic cutter based at least in part on receipt of the indication to deploy.

6. The satellite dispenser door release mechanism of claim 5, further comprising a driver configured to supply one or both of a driving voltage and a driving current to fire the pyrotechnic cutter.

7. A satellite dispenser, comprising:
a dispenser body that defines an internal payload area;
a dispenser door connected to the dispenser body at a hinged edge; and
a door release mechanism comprising a first pyrotechnic cutter and a second pyrotechnic cutter, each cutter configured to receive a wire or cable in a position to cut the wire or cable upon firing of the pyrotechnic cutter, the door release mechanism being configured to release the dispenser door to be opened at least in part by firing the first pyrotechnic and to fire the second pyrotechnic cutter at least in part in response to receiving an indication that the first pyrotechnic cutter was fired or attempted to be fired but failed to cut the wire or cable.

8. The satellite dispenser of claim 7, wherein the door release mechanism further includes a wire or cable positioned in or near each of the pyrotechnic cutters in a manner associated with cutting the wire or cable upon firing of each of the pyrotechnic cutters.

9. The satellite dispenser door release mechanism of claim 8, wherein the wire or cable comprises 0.032 inch to 0.062 inch steel cable.

10. The satellite dispenser of claim 7, further comprising a pusher and pusher spring assembly configured to exert a force to push the dispenser door toward an open position upon release of the dispenser door.

11. The satellite dispenser of claim 7, wherein the door release mechanism further includes a retraction plunger and associated retraction spring configured to retract a door side end of a wire or cable comprising the door release mechanism into a cavity upon the wire or cable being cut by firing of the pyrotechnic cutter.

12. The satellite dispenser of claim 7, further comprising a control module configured to receive an indication to deploy and to fire the pyrotechnic cutter based at least in part on receipt of the indication to deploy.

13. The satellite dispenser of claim 12, further comprising a driver configured to supply one or both of a driving voltage and a driving current to fire the pyrotechnic cutter.

\* \* \* \* \*